(12) United States Patent
Au

(10) Patent No.: US 10,904,507 B2
(45) Date of Patent: Jan. 26, 2021

(54) SINGLE DISPLAY PIPE MULTI-VIEW FRAME COMPOSER METHOD AND APPARATUS

(71) Applicant: ATI Technologies ULC, Markham (CA)

(72) Inventor: Dennis Au, Toronto (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 16/166,456

(22) Filed: Oct. 22, 2018

(65) Prior Publication Data

US 2019/0058864 A1 Feb. 21, 2019

Related U.S. Application Data

(62) Division of application No. 14/529,214, filed on Oct. 31, 2014, now Pat. No. 10,142,607.

(Continued)

(51) Int. Cl.
*H04N 13/122* (2018.01)
*G09G 3/00* (2006.01)
(Continued)

(52) U.S. Cl.
CPC .......... *H04N 13/122* (2018.05); *G09G 3/003* (2013.01); *G09G 5/397* (2013.01); *H04N 13/30* (2018.05); *H04N 13/302* (2018.05); *G09G 5/14* (2013.01); *G09G 2360/06* (2013.01); *G09G 2360/08* (2013.01)

(58) Field of Classification Search
CPC .... H04N 13/122; H04N 13/30; H04N 13/302; G09G 3/003; G09G 5/397; G09G 2360/06; G09G 2360/08; G09G 5/14
See application file for complete search history.

(56) References Cited

U.S. PATENT DOCUMENTS

2003/0122815 A1* 7/2003 Deering .................... G06T 5/20
345/419
2009/0109988 A1* 4/2009 Musunuri ................ G06F 3/14
370/412

(Continued)

OTHER PUBLICATIONS

U.S. Patent and Trademark Office; Non-Final Rejection; U.S. Appl. No. 14/529,214; dated Sep. 22, 2017.

(Continued)

*Primary Examiner* — Tat C Chio
(74) *Attorney, Agent, or Firm* — Faegre Drinker Biddle & Reath LLP

(57) ABSTRACT

A method and apparatus for providing multi-view composed frames uses a single display pipe mechanism. The single display pipe includes, in one example, a memory requestor that fetches multi-view data from a frame buffer using a plurality of viewports. The single display pipe may also include a multi-view packer. Each viewport of the single display pipe has access to a frame buffer holding multi-view frame data, and may be configured to have access to different areas of the frame buffer. In this fashion the single display pipe may fetch data representing more than one view of a multi-view frame. Additionally, the multi-view packer combines the data fetched from one or more of the viewports to form a multi-view frame to be supplied for display.

12 Claims, 7 Drawing Sheets

Related U.S. Application Data

(60) Provisional application No. 61/898,174, filed on Oct. 31, 2013.

(51) Int. Cl.
  *G09G 5/397* (2006.01)
  *H04N 13/30* (2018.01)
  *H04N 13/302* (2018.01)
  *G09G 5/14* (2006.01)

(56) References Cited

U.S. PATENT DOCUMENTS

| | | |
|---|---|---|
| 2010/0095326 A1 | 4/2010 | Robertson, III |
| 2011/0169928 A1* | 7/2011 | Gassel ................ H04N 13/344 348/53 |
| 2014/0055400 A1* | 2/2014 | Reuschel ............... G06F 9/452 345/173 |
| 2014/0111531 A1* | 4/2014 | Kwa .................... G09G 3/3611 345/545 |
| 2014/0292788 A1 | 10/2014 | Tripathi et al. |
| 2014/0320631 A1 | 10/2014 | Olsson et al. |
| 2015/0116468 A1 | 4/2015 | Au |
| 2015/0123993 A1* | 5/2015 | Ohba ...................... G09G 5/00 345/629 |

OTHER PUBLICATIONS

U.S. Patent and Trademark Office; Final Rejection; U.S. Appl. No. 14/529,214; dated Feb. 8, 2018.

\* cited by examiner

SINGLE DISPLAY PIPE MULTI-VIEW FRAME COMPOSER METHOD AND APPARATUS

RELATED APPLICATIONS

This application is a divisional application of U.S. application Ser. No. 14/529,214, filed on Oct. 31, 2014, having inventor Dennis Au, titled "SINGLE DISPLAY PIPE MULTI-VIEW FRAME COMPOSER METHOD AND APPARATUS", which claims priority to Provisional Application Ser. No. 61/898,174, filed on Oct. 31, 2013, having inventor Dennis Au, titled "SINGLE DISPLAY PIPE MULTI-VIEW FRAME COMPOSER METHOD AND APPARATUS", both of which are incorporated herein by reference.

BACKGROUND OF THE DISCLOSURE

The disclosure relates generally to systems that generate composed frames and more particularly to systems that employ display pipes to generate multi-view composed frames.

Display pipes are typically used in systems that generate single-view (e.g. 2D) or multi-view (e.g. 3D) images. These display pipes typically contain at least a memory requester that requests and fetches frame data via a single viewport from a display content in a frame buffer, as well as a "packer" and scaler dedicated to each display pipe that provides the image to a display device such as an LED display or other suitable display. The viewport is logic that typically defines starting memory locations and size of an area of the frame buffer that the display pipe has access to for a display frame. Areas outside of the viewport are typically not accessible by the display pipe. For single-view images, only one display pipe has typically been required to generate the images. This is because with single-view images only one dimension (e.g. a flat content) is represented by the frame data in the frame buffer. Thus the memory requestor fetches data as defined by the viewport from the frame buffer, and the packer provides the image to the display device. In contrast, however, frame data for a multi-view image represents more than one dimension. For example, 3D images give the impression of depth. To account for depth, frame data usually comprises left eye view data and right eye view data. The right eye view data is typically similar to the left eye view data but horizontally offset. By combining the right eye view with the left eye view data, a perception of depth is created. Thus generating multi-view images requires reading from the frame buffer data representing at least two views.

However, because multi-view images require reading data from the buffer representing more than one view (e.g. left eye view and right eye view for 3D stereoscopic images), using just one display pipe has not been adequate. The format pattern of the data representing multi-view images may be in the form of composed, or non-composed, frame data. Composed frame data may be in the form of "top/bottom", "side-by-side", "frame pack" or any other format known to one of ordinary skill in the art. For example in the "top/bottom" format the frame data associated with one view appears first in the frame buffer, followed by the data for another view. As another example in the "frame pack" format the data representing the multiple views is packed together whereby the beginning of the frame data representing one view is merely offset in the frame buffer from the frame data representing another view. Therefore typically the viewport window for all multi-views would need to provide access to the same areas of the frame buffer. For non-composed frame data, the data representing the multiple views have not been packed together, and would typically reside in separate areas of memory. For example for stereoscopic 3D images, a frame buffer may hold data associated with a left eye view in an area of memory, and data associated with a right eye view in a separate area of memory. Thus, the viewport windows required to read the frame data for the multiple views would need to allow access to different areas of the frame data buffer.

In either the case of composed or non-composed frame data, if a single display pipe were used to provide the multi-view display image, artifacts within the displayed image would result because a single display pipe would not be able to distinguish between the multiple views in the frame buffer. Therefore, one solution has been to use more than one display pipe, whereby each display pipe reads from the frame buffer frame data associated with a different particular eye view. For example, for stereoscopic 3D views, one display pipe would read left eye view data from the frame buffer, while another display pipe would read right eye view data from the frame buffer. The data would then be packed into a multi-view frame to be provided for display. As noted above, although single viewports are known to crop (e.g., scale) a single content in a frame buffer artifacts result when using a single viewport for stereoscopic images. Therefore, two display pipes are used, one for even eye image.

However, many problems arise when using more than one display pipe to generate the same multi-view image. For example, because typically only one display pipe is needed to generate single-view images, each display pipe could be used to provide a different display with single-view images. Thus, a system may support as many displays as it has display pipes when generating only single-view images. However, because providing multi-view images has required more than one display pipe, the system would not be able to support as many displays. Another problem that presents itself when needing to use more than one display pipe to provide images to one display relates to power savings. For example, the system will consume more power to support multi-view display images because more than one display pipe would be required to operate. Thus instead of activating only one display pipe to provide multi-view images, a plurality of display pipes would have to be activated. Many other problems associated with having to use two instead of one display pipe to generate images are realized by those with ordinary skill in the art.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Figure 1:
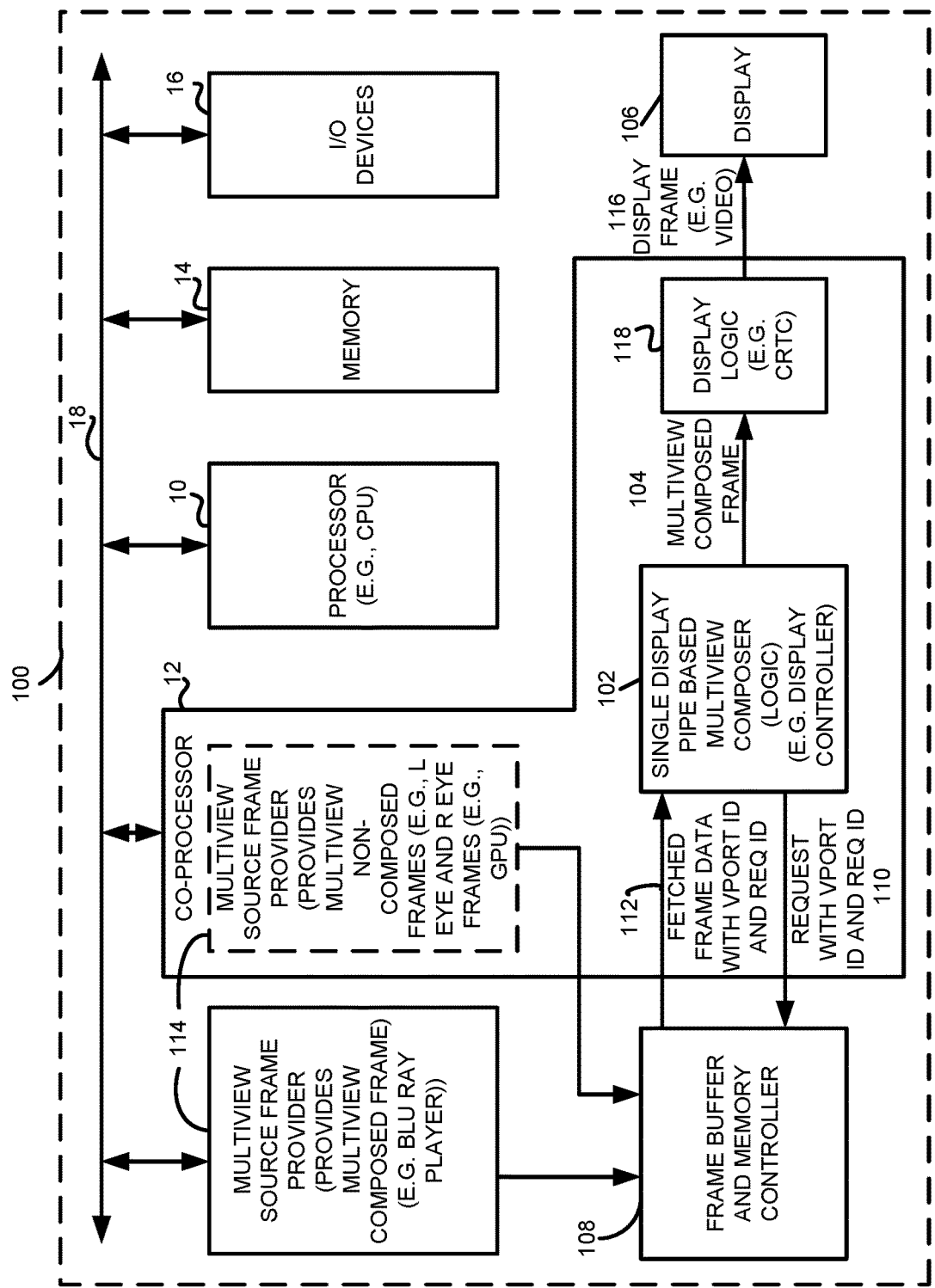
FIG. 1 is a block diagram of an apparatus illustrating one example of an embodiment employing an integrated circuit with a single display pipe based multi-view composer that fetches data from a frame buffer and provides multi-view composed frames to a display in accordance with one example set forth in the disclosure.

Briefly, a method and apparatus for providing multi-view composed frames uses a single display pipe mechanism. The single display pipe includes, in one example, a memory requestor that fetches multi-view data from a frame buffer as part of a plurality of viewports. The single display pipe may also include a multi-view packer that packs frame data from both eye frames. Each viewport of the single display pipe has access to a frame buffer holding multi-view frame data, and may be configured to have access to different areas of the frame buffer. In this fashion the single display pipe may fetch data representing more than one view of a multi-view frame. Additionally, the multi-view packer combines the data fetched by one or more of the viewports to form a multi-view frame to be supplied for display. The method and apparatus, therefore, allow for only a single display pipe to be used to generate multi-view frames. In one example, the apparatus operates in different modes such that other display pipes within the system may be turned off as to save power, or used to generate different frames. In one example, a single display pipe recognizes different portions such as left eye and right eye or top and bottom portions in a single composed frame and scales each eye frame or eye view separately. In one example, two hardware viewports or hardware cropping stages are used. Each viewport includes configuration registers and request generators that define the location and size (height and width) of content in the frame buffer to fetch. The display pipe requests and recognizes left and right eye portions in a single composed mulitview frame and can use a single scaler and packer to scale and pack mulitview frame data. In one example a driver (CPU executing driver code) may populate the multiple viewport configuration registers for the single display pipe to define the location and size of the frame content that is accessed by each view port.

The method and apparatus thus may provide a way to use fewer resources (e.g. one display pipe rather than multiple display pipes) within a system to generate multi-view frames and may lead to less power consumption and/or improved image quality by the system. In one embodiment, scaling artifacts can be eliminated at the intersection of left and right frames wherein scaling, such as when the frame format is a composed frame format, for example, in a display pipe can be eliminated from the process. Other advantages that may result include freeing up other display pipes to be used for other purposes including generating frames for different displays, or a different input on the same display. Other advantages will be recognized by those of ordinary skill in the art.

In one example, the method and apparatus may generate viewport read requests by a single display pipe for at least two viewports of the multi-viewports of the single display pipe based on viewport configuration data. The method and apparatus may receive fetched frame data associated with each of the viewport read requests for the at least two viewports wherein the generating the multi-view composed frame is based on the received fetched frame data. In one example, each of the viewport read requests from the single display pipe include a viewport identifier (ID) associated with the viewport corresponding to the viewport read request. The method and apparatus may utilize viewport configuration data that includes viewport size data for each viewport of the multi-viewports of the single display pipe, frame buffer starting position data for each viewport of the multi-viewports of the single display pipe and frame data format pattern data for each viewport of the multi-viewports of the single display pipe.

The method and apparatus may receive single display pipe configuration data that includes viewport identifier associated with each viewport read request, a request identifier associated with the single display pipe in multi-view composed frame format data. Generating multi-view composed frames may include formatting the multi-view composed frames in accordance with the single display pipe configuration data. The method may also include scaling the fetched frame data to generate scaled frame data, selecting between the fetched frame and the scaled frame data to generate selected data such that generating the multi-view composed frames includes using the selected data. As such, fetched frame data may be scaled.

In another example, scaling may be bypassed. The fetched frame data may include, for example, side-by-side multi-view composed frame data or multi-view non-composed frame data.

In another example, where a plurality of display pipes are employed, the method and apparatus may reduce power to one or more of the plurality of display pipes when the single display pipe is in use for 3D operation.

FIG. 1 is one example of an apparatus 100 including a single display pipe based multi-view composer 102 that generates multi-view composed frames 104. The apparatus may be any suitable device including but not limited to a desktop computer, a laptop computer, a handheld device including a mobile phone, smart phone, or tablet, a media center, a gaming console, a set top box or any other suitable device. The apparatus 100 may have any suitable structure and in this example, is shown to include a first processor 10, such as a central processing unit which may include one or more processing cores, a second processor 12, such as a graphics processing unit or other suitable co-processor which may include one or more processing cores, memory 14 that may be non-transitory and store executable instructions that when executed cause the processor 10 and/or second processor 12 to operate as described herein. Input/output devices such as touch displays, keypads, speakers, and other input/output devices 16 may also be employed as known in the art. The components may communicate through any suitable bus structure and interconnects generally illustrated as 18, as known in the art. It will also be understood the multiple displays may be employed and that the functional blocks shown are not limiting.

The multi-view composer 102 fetches frame data 112 from frame buffer 108 to generate the multi-view composed frames 104 that are provided to the display 106. In requesting frame data from frame buffer 108, the composer 102 may employ a viewport identifier (ID) 110 that indicates the viewport that is requesting the data. The fetched frame data 112 may also include the viewport identifier (ID) 110 indicating the viewport that requested the data. The frame buffer 108 may be operatively coupled with one or more multi-view source frame providers 114 that may provide composed or non-composed frames. The multi-view source frame providers 114 may be any suitable provider of pixel frame information. In this example, multiple source frame providers 114 and 116 are shown. However, any suitable multi-view source frame provider may be employed. In this example, a multi-view source frame provider 114, such as a Blu Ray subsystem may provide multi-view composed frames to frame buffer 108 and may be, for example, a Blu-Ray player or any other suitable multi-view composed frame providing structure. Also shown is a multi-source frame provider that provides non-composed multi-view frames such as separate left eye and right eye frames such as from, for example, a graphics processing unit (GPU) or other suitable structure that provides non-composed multi-view frames. These are also provided to the frame buffer 108. As shown in this example, the frame buffer and memory controller are shown in the same functional block but it is recognized that frame buffer and memory controller can be separate devices as known in the art.

The single display pipe base multi-view composer 102 generates the multi-view composed frame 104 and provides it in this example, to display logic 118 which may be, for example, CRTC logic as known in the art which outputs the multi-view frames as display frames 116 for display on one or more displays 106.

As known in the art, the frame buffer may include any suitable memory such as DRAM, SDRAM, ROM, or any other suitable memory that stores digital data. As also understood, the operations described herein are carried out electronically. The display logic 118 may be any suitable known display logic such as CRTC logic that operates on a multi-view composed frame 104 and outputs the multi-view composed frame 104 into suitable display frame information 116 as known in the art. The display 106 may be any suitable display such as, but not limited to, one or more LED displays, or any other suitable display for multi-view use.

Figure 2:
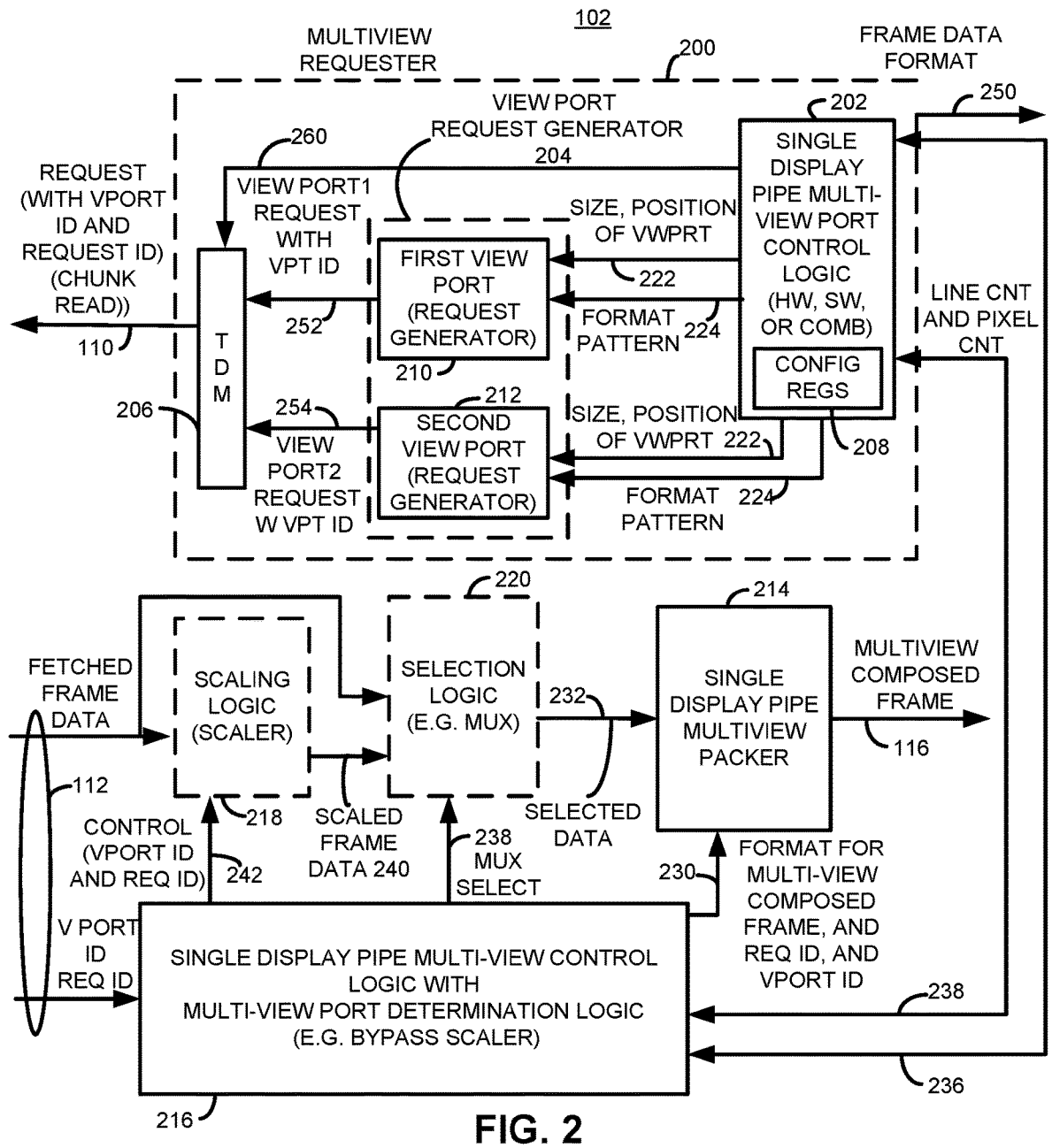
FIG. 2 is a block diagram illustrating an embodiment of integrated circuit with a single display pipe based multi-view composer in accordance with one example set forth in the disclosure.

FIG. 2 illustrates one example of the single display pipe based multi-view composer 102 employed in a single display pipe. The single display pipe based multi-view composer 102 may be implemented as part of an integrated circuit. In this example, the single display pipe based multi-view composer 102 may include a multi-view requester 200 that includes control logic 200 that may be used to control or configure viewport request generator 204 and time division multiplexing logic 206. The control logic 202 may be in the form of hardware, a processor executing code stored in memory (such as a CPU executing driver code), or any combination thereof. For example the control logic 202 may be implemented by the first processor 10, such as a host CPU that executes stored programmable instructions on one or more cores, by graphic processing unit (GPU), an integrated GPU, a general processor (e.g., APU, accelerated processing unit; GPGPU, general-purpose computing on GPU), or any suitable combination thereof or any other suitable structure. It is understood, however, that any other suitable component may also be included in the control logic 202. The control logic 202 may also include configuration registers 208 that are used to configure or control the single display pipe based multi-view composer 102. The control logic 202 and the configuration registers 208 may be configured by hardware, software, or any combination thereof. For example, the processor 10 may be operatively coupled to the configuration registers 208 to supply configuration information including the data format (e.g. "top/bottom" or "side-by-side" for composed format data), location and size of the content for each viewport and a line count and a pixel count using driver code executing on the processor 10.

The control logic 202, using the data in the configuration registers 208, configures the viewports 210, 212 with information including, for example, the size of the content for each viewportcontentcontent, the position of memory in the frame buffer the respective view-port has access to, and the frame format pattern (e.g., top/bottom, side by side, not composed) of frame data. As used herein, in one example, a viewport includes respective control registers from control registers 208 along with respective request generators that generate requests 252 and 254.

The single display pipe based multi-view composer 102 also includes a single display pipe multi-view packer 214 and single display pipe multi-view control logic 216 with multi-viewport determination logic. In one embodiment, the single pipe based multi-view composer 102 may also include scaling logic 218 and selection logic 220.

The single display pipe multi-view control logic with multi-viewport determination logic 216 both controls the single display pipe multi-view packer 214 as noted above and also determines which multi-viewport is being operated on based on the control register information 208 and with the configuration data that is stored in configuration register 208, for example, the data indicating the request viewport ID and format type internally shown as data 236. In addition, line count and pixel count control data 238 is provided by multi-viewport control logic 202 to generate the x and y coordinates for the viewports. In addition, the single display pipe multi-view control logic 216 provides multiplexer select signal 238 to the selection logic 220 to select between the fetched frame data 112 or the scaled frame data 240 generated by the scaling logic 218. In addition, scaler control data 242 is provided to control the scaling logic to scale the frame data to a certain scale value as known in the art.

Figure 3:
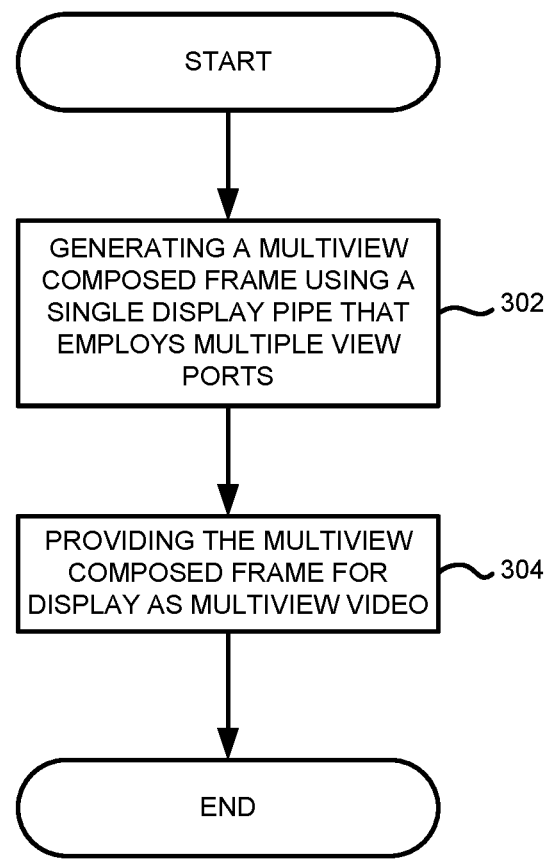
FIG. 3 is a flowchart illustrating one example of a method for using a single display pipe to provide a multi-view composed frame for display in accordance with one example set forth in the disclosure.

Referring also to FIG. 3, which shows one example of a method for providing multi-view video, in one example, the method 300 may be carried out by the single display pipe based multi-view composer 102, however it will be recognized that any suitable structure may perform the operations. In addition, it will be recognized that the order of the steps may be changed as desired with respect to the methods described herein. As shown in block 302, the method includes generating a multi-view composed frame 104 using a single display pipe that employs multiple viewports 210 and 212. The method as shown in block 304 includes providing the multi-view composed frame for a display as multi-view video 116. The providing may be done, for example, by the display logic 118 or any other suitable logic. The display logic generates the display timing such that the multiview composed frame 104 will be put out to the display 106 in the proper timing.

Figure 8:
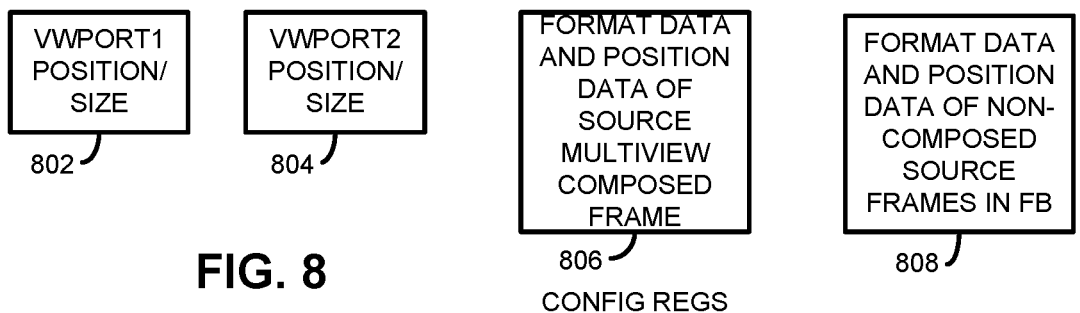
FIG. 8 is a block diagram illustrating one example of configuration registers in accordance with one embodiment of the disclosure.

Referring also to FIG. 8, the configuration registers 208 are programmable by the control logic 202 and store viewport configuration data in one or more registers 802-808 for each viewport of the single display pipe. In one example, a configuration register 802 and 804 may include viewport configuration data that includes viewport size data shown as 222 for each viewport of the multi-viewports of the single display pipe. The viewport configuration data may also include frame buffer starting position data for each viewport of the multiple viewports of the single display pipe that indicates the starting position within the frame buffer for a respective viewport 210 and 212. The viewport configuration data stored in the configuration registers 806 may also include frame data format pattern data 224 for each viewport 210 and 212 with the multiple viewports of the single pipe. The format pattern data may indicate, for example, that the particular viewport is accessing a composed multiview frame, a plurality of non-composed frames or other suitable frame format. If desired a configuration register 808 for non-composed multiview frames may be used. The format data and position data to target multi-view composed frame is set for each viewport 210 or 212.

The single display pipe multi-view packer 214 is operative to receive single display pipe configuration data 230 from the single display pipe multi-view control logic 216. The single display pipe configuration data 230 includes a viewport identifier associated with each viewport read request, a read request identifier associated with a single display pipe to identify the single display pipe from other display pipes, and multi-view composed frame format data 224. The display pipe multi-view packer logic 214 formats the multi-view composed frames that are fetched by the viewports in accordance with the single display pipe configuration data.

If employed, the scaling logic 218 scales the fetched frame data associated with each viewport separately so only one scaler need be used for two eye frames and the selection logic 220 selects between the fetched frame data and the scaled frame data to generate selected data 232. The selected data 232 is then packed by the single display pipe multi-packer 214 in accordance with the single display pipe configuration data 230.

Figure 4:
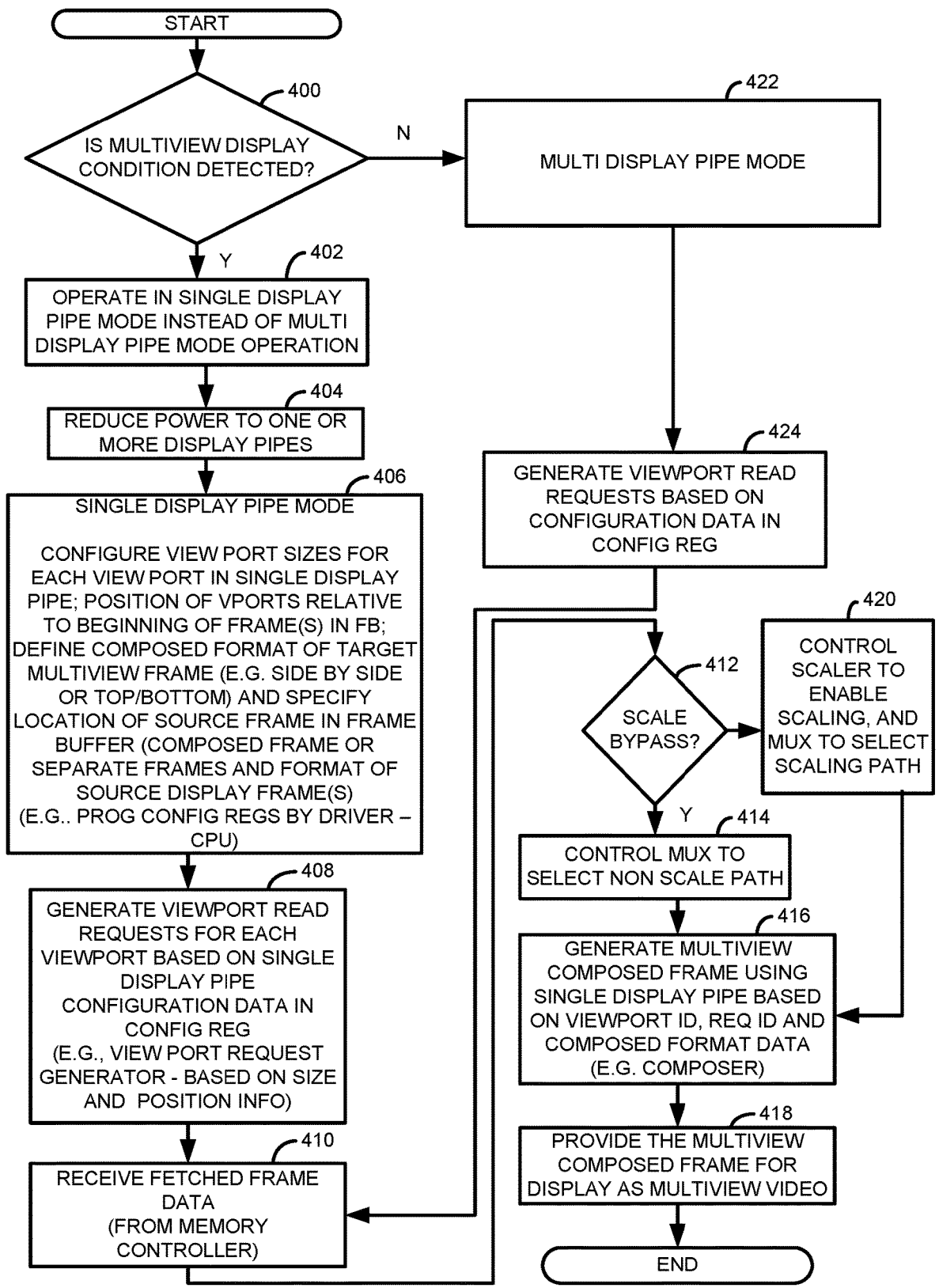
FIG. 4 is a flowchart illustrating an example of a method for deciding whether to operate with a single display pipe or multiple display pipes to provide a multi-view composed frame for display in accordance with one example set forth in the disclosure.
Figure 5:
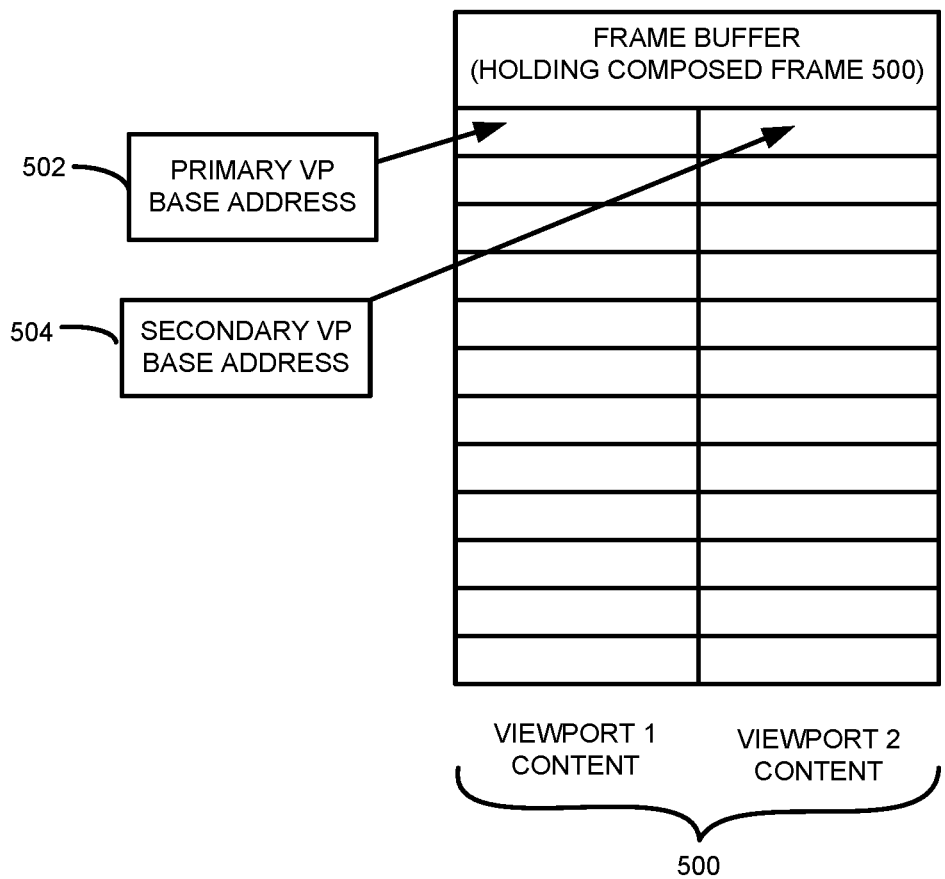
FIG. 5 is an illustration of one example of a frame buffer holding a composed multi-view frame.
Figure 6:
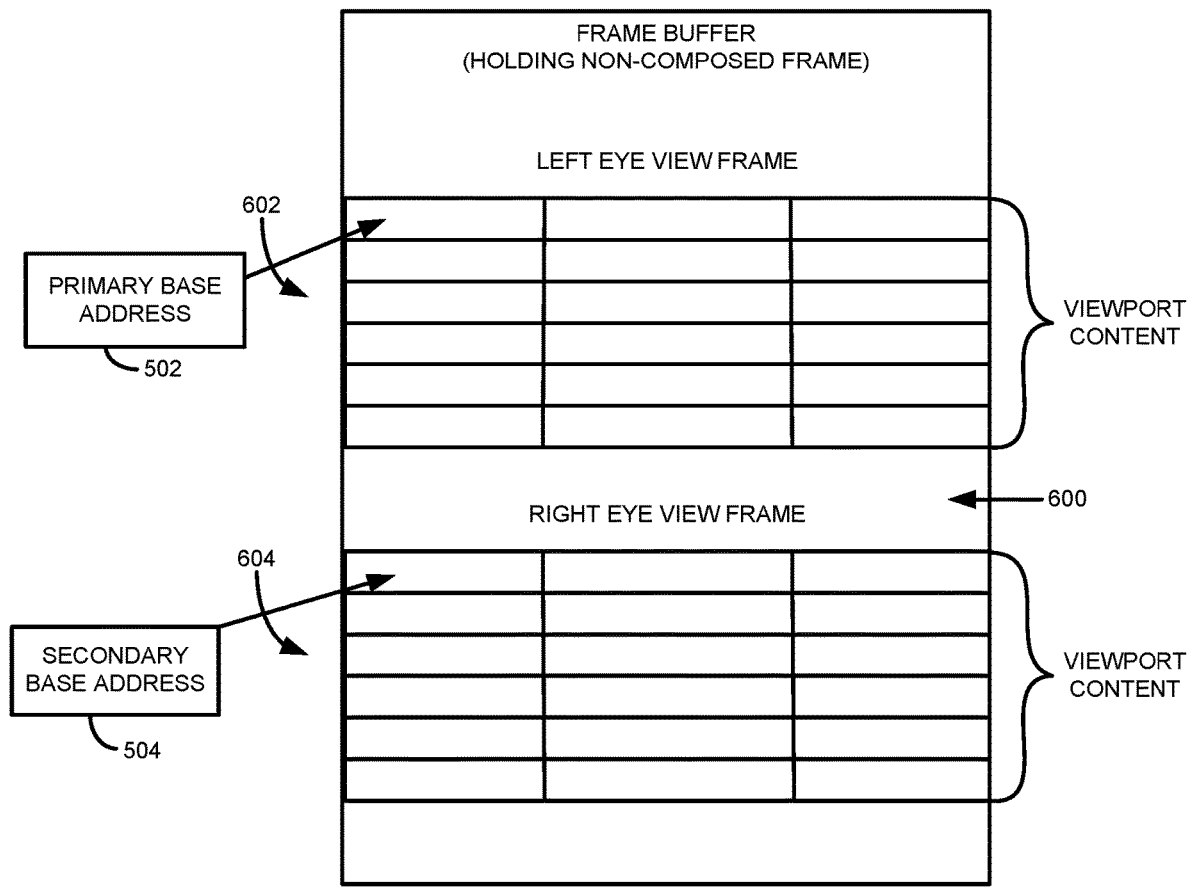
FIG. 6 is an illustration of one example of a frame buffer holding a non-composed multi-view frame.
Figure 7:
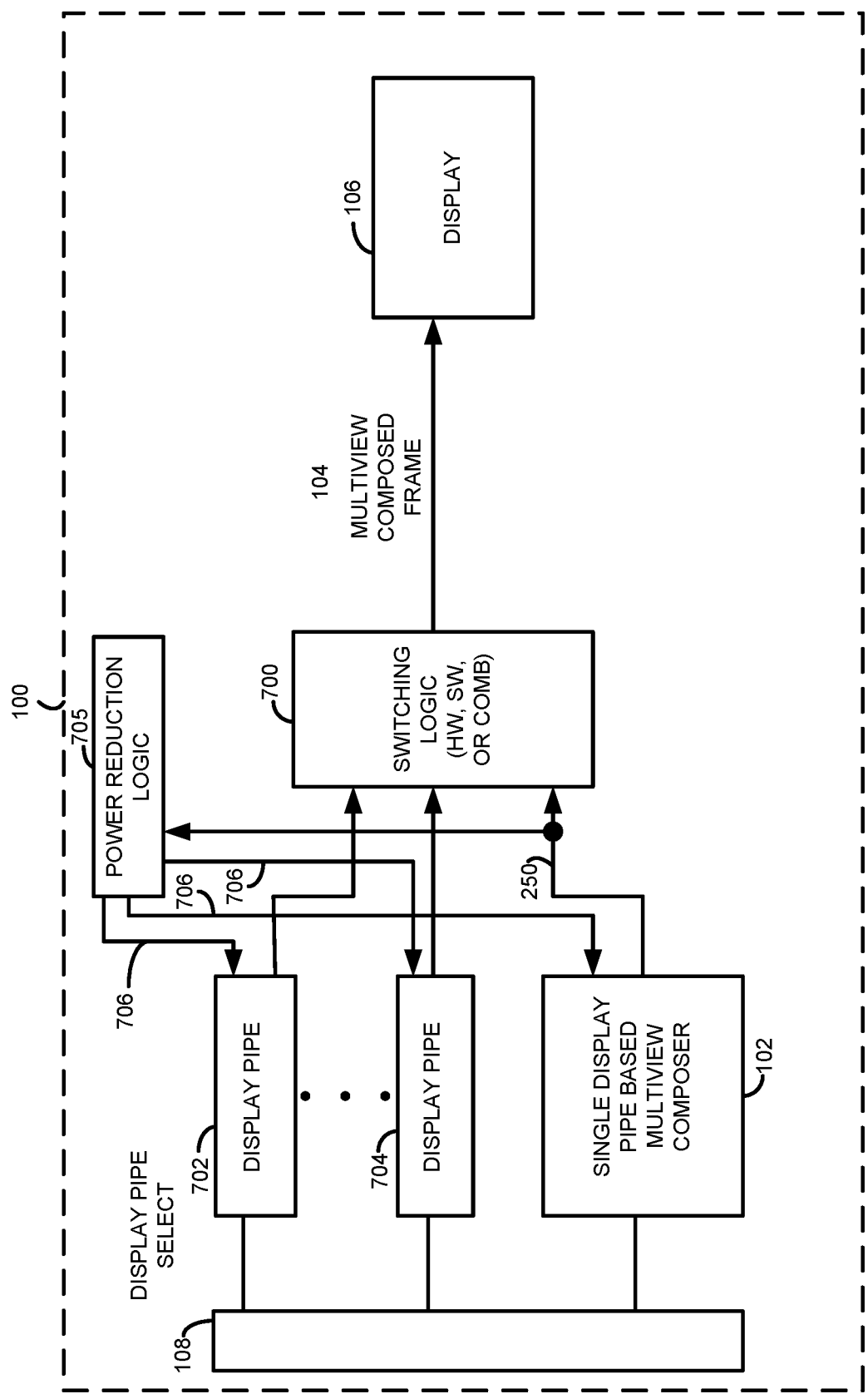
FIG. 7 is one example of an apparatus that employs multiple display pipe operation.

Referring also to FIGS. 4-6, operation of the single display pipe based multi-view composer 102 will be described. As shown in FIG. 4, the method includes as shown in block 400, determining if multi-view display condition is detected. This may be done, for example, by the first processor 10 executing an application that utilizes 3D operation, for example, and the application or associated driver causes the configuration registers 208 to be configured. As shown in block 402, the method includes operating in single display pipe mode instead of a multi-pipe display mode operation. For example, the single display pipe multi-viewport control logic 202 may provide a single pipe mode indication signal (i.e., analog or digital data) 250 to switching logic shown in FIG. 7 as switching logic 700 which may be, for example, multiplexing logic to allow selection of output from multiple display pipes 702, 704 or the single display pipe 102. As also shown in FIG. 7, power reduction logic 705, such as any suitable power management system in response to the control information 250 may generate power reduction control data 706 to one or more of the display pipes 702, 704. As shown in block 404, the method includes reducing power to one or more display pipes 702, 704 by the power of reduction logic. This may include completely shutting power off to the display pipe, changing the power voltage level to lower the voltage level, changing clock frequencies or any other suitable power reduction control operation as desired.

Referring back to FIG. 4, the method includes as shown in block 406, when in a single display pipe mode, configuring the viewport sizes for each viewport in a single display pipe. This may be done, for example, by the processor 10 executing driver code to set the viewport sizes by populating the configuration registers 208 with data 222 and 224 indicating the position of the viewports relative to the beginning of a frame in a frame buffer via the data 222 and defining the composed format of the target multi-view frame as to whether it is, for example, side-by-side or top/bottom by providing the format pattern data 224 into the configuration registers. The data 222 and 224 specifies the location of the source frame in the frame buffer and whether it is a composed frame or separate frames. The viewport request generator 204 obtains the viewport configuration data 222 and 224 for each of the respective viewports and as noted, the viewport configuration data can include the viewport size data for each viewport of the multiple viewports of the single display pipe, frame buffer starting position data and frame data format pattern data as noted above.

As shown in block 408, the method includes generating, such as by the viewport request generator 204, viewport read requests for each viewport 210 and 212 based on the configuration data in the configuration registers 208 and in particular, the configuration data 222 and 224. Each of the viewports 210 and 212 operate as request generators to generate viewport requests with viewport ID data 252 and 254, respectively. By way of example, the read request includes, for example, information about what portion (i.e. position) and amount of the viewport data it is requesting at a time and also which viewport in multi-view is requesting the data, along with an identifier that is then used when the data is fetched so that the single display pipe multi-view packer 214 can suitably pack the fetched data from the multiple viewports to generate a composed frame. As shown in block 410, after the request is made, the data is fetched and received, for example, by the single display pipe multi-view packer 214 which obtains the data and the single display pipe multi-view control logic 216 evaluates the viewport ID and request ID corresponding with the data to determine how to control the display pipe multi-view packer and/or the scaling logic. The multiplexer 206 is controlled using select control signal 260 to select which viewport is sending the request. A request is usually a chunk read request. As shown in block 412, the method includes determining whether scaling is to be bypassed. This may be indicated by data 236 based on what the needs of the 3D application are. If scaling is to be bypassed, as shown in block 414, the method includes controlling the selection logic 220 via mux select data 238 to select the non-scaling path. As shown in block 416, the method includes generating the multi-view composed frame generated based on the viewport ID, the request ID and the composed format data by the single display pipe multi-view packer. This includes, for example, assembling the obtained pixel information obtained by the differing viewports into a composed frame. As shown in block 418, the method includes providing a multi-view composed frame 116 for display as multi-view video.

Referring back to block 412, if scaling is not to be bypassed, the method includes, as shown in block 420, controlling scaling logic 218 via control data 242 to enable scaling and selecting the multiplexer or selection logic 220 to select the scaled frame data 240 as the information to be passed to the single display pipe multi-view packer 214.

Referring back to block 400, if a multi-display pipe mode has been detected, meaning that more than one display pipe is to be used to process pixel data for display, no multi-view viewport IDs are needed. Instead, each display pipe 702 and 704 is configured using their individual viewports as known in the art. This is shown in block 422. As shown in block 424, the method includes generating viewport read requests based on the configuration data and the config register in a conventional manner for display pipe 702 and 704. It will be recognized that the single display pipe having multiple viewports can also be used as a single viewport pipe by configuring the registers 208 accordingly so that only one of the viewports 210 or 212 is employed.

Referring also to FIGS. 5 and 6, one display pipe recognizes different portions (left eye and right eye or top and bottom) in a single composed multiview source frame and scales each portion separately. Two viewports are used in a single display pipe. The single display pipe requests and recognizes left and right eye portions in the single source composed frame.

By way of example, the stereo 3D frame in the frame buffer can be entirely separated left/right eyes frames or it can be packed left/right eyes a single composed source frame 500. The single display pipe based multi-view composer logic 102 supports stereo 3D base address 502, 504 and stereo 3D source viewports. The stereo 3D base address 502, 504 allows the multi-view requester (frame buffer content reader) to fetch left and right eye data from two entirely separated frame spaces 602, 604. This means that there may be a gap 600 between the left and right eye frames in the frame buffer as long as the content storage conforms to the frame alignment requirement.

When there is a composed frame 500 stored in the frame buffer, the stereo 3D viewpoints allow cropping of the left and right eye data out of a single composed frame packed with left and right eye frames. This means that there is zero gap separation between the eye frames.

The primary_content_base and secondary_content_base are two programmable parameters that point to the start addresses of the left and right eyes frames respectively.

Similarly, the primary_viewport_start and secoundary_viewport_start are two programmable parameters that point to the starting pixel of the left and right eyes respectively. The viewport start is in per pixel granularity horizontally and per two lines granularity vertically. However, any suitable granularity may be employed.

When the left and right eyes are from two separated frames, the
Primary_base_address=beginning address of the left eye content;
Secondary_base_address=beginning address of the right eye content; and
Primary_viewport_start=Secondary_viewport_start=X,Y coordinates of the first source pixel.

When the left and right eyes are from the single packed frame (composed frame), the
Primary_base_address=Seconday_base_address=beginning address of the packed frame;
Primary_viewport_start=X,Y coordinates of the first left eye source pixel within the frame; and
Secondary_viewport_start=X,Y coordinates of the first right eye source pixel within the frame.

Note that in one example, the stereo viewport size for both left and right eyes are the same size. The control logic 200 is responsible to ensure that the content is big enough to cover entire viewport area. As noted above, the control logic 200 may include a processor that executes stored instructions from non-transitory memory that when executed causes the processor to operate as described. Dedicated hardware may also be used. In the special stereo 3D use case mode where there is only a non-stereo 3D frame in the frame buffer, the pseudo-stereo 3D output can be achieved by offsetting the primary/secondary viewport start by a number of pixels horizontally. In this special use case, the control logic 200 must ensure that the content is wide enough to cover the maximum possible horizontal shifted viewport such that both viewports will not be outside of the content.

The disclosed integrated circuit designs may be employed in any suitable apparatus including but not limited to, for example, printers, high definition televisions, handheld devices such as smart phones, tablets, portable devices such as laptops or any other suitable device. Such devices may include for example, a display that is operatively coupled to the integrated circuit where the integrated circuit may be, for example, a GPU, CPU or any other suitable processing circuitry that provides image data for output on one or more displays. Such an apparatus may employ the integrated circuit as noted above including the transcoder 202 and if desired, one or more of the decoder and memory encoder as described as well as any of the one or more described configurations.

Also, integrated circuit design systems (e.g., work stations including, as known in the art, one or more processors, associated memory in communication via one or more buses or other suitable interconnect and other known peripherals) are known that create wafers with integrated circuits based on executable instructions stored on a non-transitory computer readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic and circuits described herein may also be produced as integrated circuits by such systems using the computer readable medium with instructions stored therein. For example, an integrated circuit with the aforedescribed logic and structure may be created using such integrated circuit fabrication systems. In such a system, the computer readable medium stores instructions executable by one or more integrated circuit design systems that causes the one or more integrated circuit design systems to produce an integrated circuit. The integrated circuit includes logic operative to generate multi-view composed frames using a single display pipe that employs multiple viewports and provide the multi-view composed frames for display as multi-view video and other operations as described herein.

The above detailed description of the invention and the examples described therein have been presented for the purposes of illustration and description only and not by limitation. It is therefore contemplated that the present invention covers any and all modifications, variations or equivalents that fall within the spirit and scope of the basic underlying principles disclosed above and claimed herein.

What is claimed is:

1. An apparatus for providing multi-view video comprising:
a first display pipe that employs multiple viewports, each of the multiple viewports comprising a memory location and size of an area of a frame buffer that the first display pipe has access to;
at least a second display pipe that employs a single viewport that comprises a memory location and size of an area of the frame buffer that the second display pipe has access to;
switching logic, operatively coupled to the first display pipe and the second display pipe, operative to switch between the first display pipe and the second display pipe; and
a single display pipe based multi-view packer operative to generate multi-view composed frames using the first display pipe that employs multiple viewports.

2. The apparatus of claim 1 comprising:
single display pipe multi-viewport control logic operative to provide viewport configuration data for multiple viewports to the first display pipe; and
viewport request generator logic operative to:
   generate viewport read requests for at least two of the viewports of the multiple viewports of the first display pipe based on the viewport configuration data; and
   generate a viewport identifier (ID) for viewport read requests corresponding to each of the at least two viewports.

3. The apparatus of claim 2 wherein the viewport configuration data provided by the single display pipe multi-viewport control logic comprises:
   a viewport size data for each viewport of the multiple viewports to the first display pipe;
   a viewport starting position data for each viewport of the multiple viewports to the first display pipe; and
   a frame data format pattern data for each viewport of the multiple viewports to the first display pipe.

4. The apparatus of claim 2 comprising single display pipe multi-view packer control logic operative to:
   provide single display pipe configuration data comprising:
      a viewport identifier (ID) associated with each viewport read request;
      a request identifier (ID) associated with the first display pipe; and
      a multi-view composed frame format data;
   wherein the first display pipe is operative to receive fetched frame data associated with each of the viewport read requests of the at least two of the viewports of the multiple viewports of the first display pipe; and
   wherein the single display pipe based multi-view packer is operative to:
      base the multi-view composed frame on the received fetched frame data; and
      format the multi-view composed frame in accordance with the single display pipe configuration data.

5. The apparatus of claim 4 comprising:
power reduction logic operative to:
   reduce power to the second display pipe when the first display pipe is in use; and
   reduce power to the first display pipe when the second display pipe is in use;
scaling logic operative to scale the received fetched frame data to generate scaled frame data; and
selection logic operative to:
   select between the received fetched frame data and the scaled frame data; and
   provide the selected data as the fetched frame data to the display logic.

6. The apparatus of claim 4 comprising display logic operative to provide display frames to a display.

7. The apparatus of claim 1 wherein the first display pipe employs multiple viewports that define start memory locations and size of an area of a frame buffer used by the first display pipe and wherein the second display pipe employs a single viewport that defines starting memory locations and size of an area of a frame buffer used by the second display pipe.

8. A method for providing multi-view video comprising:
switching between a first display pipe that employs multiple viewports each of the multiple viewports comprising a memory location and size of an area of a frame buffer that the first display pipe has access to and at least a second display pipe that employs a single viewport that comprises a memory location and size of an area of the frame buffer that the second display pipe has access to;
generating multi-view composed frames using the first display pipe that employs multiple viewports; and
outputting the generated multi-view composed frames for display.

9. The method of claim 8 comprising:
providing viewport configuration data for multiple viewports to the first display pipe;
generating viewport read requests for at least two of the viewports of the multiple viewports of the first display pipe based on the viewport configuration data; and
generating a viewport identifier (ID) for viewport read requests corresponding to each of the at least two viewports.

10. The method of claim 9 wherein the viewport configuration data provided by the single display pipe multi-viewport control logic comprises:
   a viewport size data for each viewport of the multiple viewports to the first display pipe;
   a viewport starting position data for each viewport of the multiple viewports to the first display pipe; and
   a frame data format pattern data for each viewport of the multiple viewports to the first display pipe.

11. The method of claim 9 comprising providing single display pipe configuration data comprising:
   a viewport identifier (ID) associated with each viewport read request;
   a request identifier (ID) associated with the first display pipe; and
   a multi-view composed frame format data;
wherein the method further comprises:
   receiving, by the first display pipe, fetched frame data associated with each of the viewport read requests of the at least two of the viewports of the multiple viewports of the first display pipe;
   basing the multi-view composed frame on the received fetched frame data; and
   formatting the multi-view composed frame in accordance with the single display pipe configuration data.

12. The method of claim 11 comprising:
reducing power to the second display pipe when the first display pipe is in use;
reducing power to the first display pipe when the second display pipe is in use;
scaling logic operative to scale the received fetched frame data to generate scaled frame data;
selecting between the received fetched frame data and the scaled frame data; and
providing the selected data as the fetched frame data to the display logic.

* * * * *